June 2, 1931.  L. COOK  1,808,207
GAUGE
Filed Aug. 27, 1927
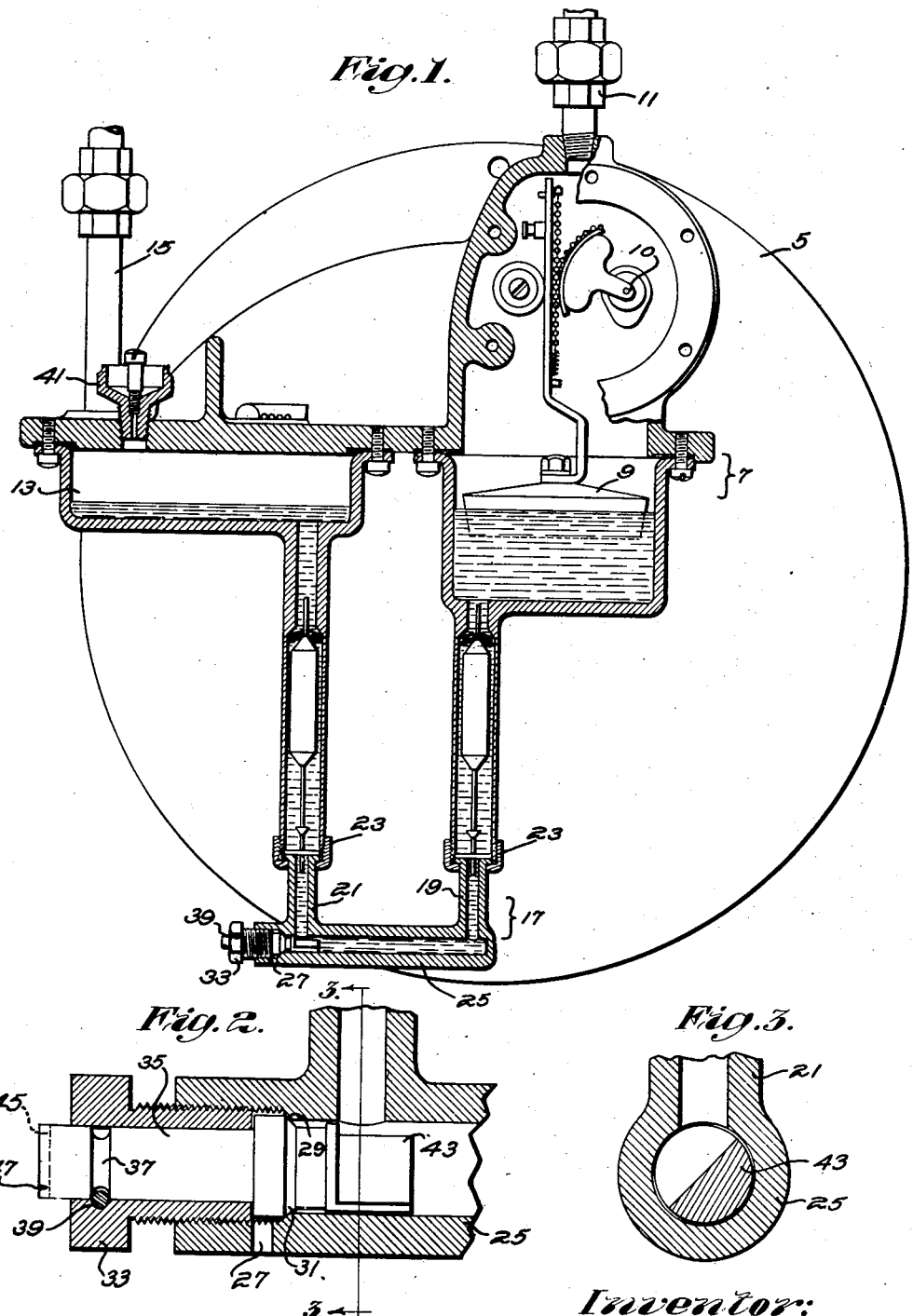
Inventor:
Lyman Cook.

Patented June 2, 1931

1,808,207

UNITED STATES PATENT OFFICE

LYMAN COOK, OF FOXBORO, MASSACHUSETTS, ASSIGNOR TO THE FOXBORO COMPANY, OF FOXBORO, MASSACHUSETTS, A CORPORATION OF MASSACHUSETTS

GAUGE

Application filed August 27, 1927. Serial No. 215,921.

This invention relates to gauges of the U-tube type, that is, gauges embodying two liquid-containing wells in communication at their lower portions, whether or no organized in the shape of a U, the liquid in the wells being subjected to pressures, one of which may be atmospheric, so that the fluctuation of the liquid is in response to the differential of the pressures. The objects of the invention are to provide improved means for the release of the mercury or other liquid either to drain the instrument or to adjust the quantity of liquid therein and also to provide means for controlling the passage of liquid from one well or leg to the other. The latter means may be utilized for damping the response of the instrument to rapid fluctuations of pressure which would otherwise render its use inconvenient.

My invention will be well understood by reference to the following description of an illustrative embodiment thereof shown by way of example in the accompanying drawings, wherein:

Fig. 1 is a vertical section through a gauge, the construction of which embodies the form of my invention;

Fig. 2 is an enlarged detail likewise in vertical section; and

Fig. 3 is a section on the line 3—3 of Fig. 2.

As an example of the application of my invention I have herein shown a gauge of the float type which may be in many respects similar in construction to that shown in the patent to E. H. Bristol No. 1,592,415, July 13, 1926. The gauge shown is a part of a recording instrument embodying a case 5 enclosing the clock-work mechanism and the like. The measuring instrumentality proper is mounted on the back of this case and in the form shown is essentially a U tube both in principle and in external configuration. The gauge may embody a high pressure chamber 7 in which is received the float 9 connected by suitable mechanism to the indicating shaft 10, pressure being admitted to the chamber through pipe 11, and a low pressure chamber 13, to which pressure is admitted through pipe 15. The lower portions of these chambers may be reduced in diameter and be of the substantially tubular form shown and a connection is made between them by an element 17, herein itself in the form of a U and embodying the vertical branches 19 and 21 secured to the extensions of the chambers 7 and 13 respectively by unions 23 and joined by a horizontal tubular connecting member 25, to the side of which open the branches 19 and 21. The connecting member 25 may be closed permanently at one end, as shown at the right in Fig. 1, while the other end extends out past the branch 21 and is open, being closed by suitable means, one form of which is herein shown and is presently to be described.

Referring particularly to Fig. 2, in the extended portion of the connection 25 I may provide a drain hole 27, and between this drain hole and the opening of the branch 21 of the connection there is an annular valve seat 29 on which may seat a valve 31 entered from the open end of the cross connection 25. Screw means are preferably utilized to press valve 31 against its seat and herein the element which forms the valve is shown as swivelled, for a purpose presently to be described, in a threaded plug 33 screwing into the open end of the cross connection 25. For this purpose the valve member is provided with a stem 35 passing centrally through the plug 33 and having an annular groove 37 receiving a cross pin 39 which locks it inseparably in position in the plug while permitting the latter to rotate and to advance or retract the valve toward and from its seat without rotation of the valve itself. It is to be understood that if the valve 31 is withdrawn toward the left from its seat it will uncover the drain hole 27 and permit mercury, which has been supplied to the instrument through the filling opening 41 in Fig. 1, to be tapped off, either for purposes of adjusting the quantity in the instrument or to drain it completely.

To provide suitable means for damping the fluctuations of mercury in the instrument the effective size of the connection between branch 21 and cross member 25 may be varied and I have herein shown the valve member 31 as carrying as an integral part thereof a segmental extension 43 opposing the junction of the branch 21 (see Fig. 3). The extension 43 as herein shown is a segment in the more limited sense of a portion of a circle cut off by a secant, but obviously the broad requirement is that it be segmental in the sense that it does not completely plug up or close the mouth of the branch 21 but is cut away or apertured to provide a channel of communication between that branch and the cross member 25, which channel can be restricted by adjustment at the mouth of the branch, such adjustment in the present instance being effected in the manner of a rotary valve.

The stem 35 of the valve member herein extends outwardly and is disposed at the exterior of the instrument provided with a screw-driver slot 45, by means of which it may be rotated on its bearing in plug 33 independently of the position of longitudinal adjustment of the valve member 31, and as will be clear from Fig. 3, the extension 43 operates across the mouth of 21 as a rotary valve and shuts off to a greater or less extent the passage of liquid to and from that leg or column of the U tube gauge. The screw-driver slot and some suitable index mark such as the notch 47 cut in the edge of the stem on the exterior end of the valve stem 35 has a definite relation to the position of segment 43 and will indicate at the exterior the position of adjustment thereof.

I have described in detail the embodiment of my invention shown by way of example in the accompanying drawings. Obviously the construction might be widely varied without departing from the principles of my invention, the particularity of the description having had for its purpose making clear the construction of the particular mechanical embodiment shown by way of example. What I claim as new and desire to secure by Letters Patent I shall express in detail in the following claims.

Claims—

1. A gauge of the U tube type having a pair of legs and a tubular connection between them extending past one of the same and terminating in an open end, a threaded plug in said open end, a member rotatively supported therein having a segmental portion opposing the junction of the adjacent leg and being exposed exteriorly to provide for rotative adjustment of the same.

2. A gauge of the U tube type having a pair of legs and a tubular connection between them extending past one of the same and terminating in an open end, there being an annular seat inwardly of said end, a threaded plug in said end, a valve rotatively supported in the plug and adapted to be pressed thereby against the seat, said valve having a segmental extension opposing the junction of the adjacent leg and being exposed exteriorly to provide for rotative adjustment of the same.

3. A gauge of the U tube type having a pair of legs and a tubular connection between them extending past one of the same and terminating in an open end, there being an annular seat inwardly of said end, a threaded plug in said end, a valve rotatively supported in the plug and adapted to be pressed thereby against the seat, said valve having a segmental extension opposing the junction of the adjacent leg and being exposed exteriorly to provide for rotative adjustment of the same, there being a lateral opening through the extending portion of said connection outwardly of said seat adapted to be exposed when the valve is retracted by the plug.

4. A gauge of the U tube type having a pair of legs and a connection between them and having an opening adjacent the junction of one of said legs with the connection, there being a seat on the wall of the opening, a valve, means for pressing the valve against the seat and a segmental member carried by the valve rotatively adjustable more or less to shut off passage of liquid to and from the adjacent leg.

5. A gauge of the U tube type having a pair of legs and a connection between them and having an opening adjacent the junction of one of said legs with the connection, there being an annular seat on the wall of the opening, a rotary valve controlling passage of liquid to and from said leg and having integral therewith a shoulder and means whereby said shoulder is caused to cooperate with said seat.

6. A gauge of the U tube type having a pair of legs and a tubular connection between them extending past one of the same and terminating in an open end, there being an annular seat inwardly of said end, a valve, means for pressing the same longitudinally against the seat and a member carried by said valve and cooperating with the junction of the adjacent leg to provide a rotary valve therefor, said member being adapted for rotative adjustment independently of the longitudinal adjustment of said first valve.

7. A U tube gauge having a cross member joining the two legs and opening laterally of one of them, there being a seat in said member outward of said leg and a drain hole outward of said seat, a valve cooperating with said seat and entering the opening of the cross member and threaded means for securing the valve therein and pressing it against the seat.

8. A U tube gauge having a cross member joining the two legs and opening laterally of one of them, there being a seat in said member outward of said leg and a drain hole outward of said seat, a valve cooperating with said seat and entering the opening of the cross member and a threaded device screwing home to press said valve against said seat and connected to said valve to lift the valve from its seat when the device is partially unscrewed and so to place the interior of the gauge in communication with the drain.

In testimony whereof, I have signed my name to this specification.

LYMAN COOK.